United States Patent
Baumgarte (10) Patent No.: US 7,760,598 B2
(45) Date of Patent: *Jul. 20, 2010

(54) METHOD AND SYSTEM FOR EVALUATING CD PLAYER RESPONSE TO ANOMALIES IN A CD

(75) Inventor: Joseph W. Baumgarte, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 893 days.

This patent is subject to a terminal disclaimer.

(21) Appl. No.: 11/542,957

(22) Filed: Oct. 4, 2006

(65) Prior Publication Data

US 2008/0084802 A1 Apr. 10, 2008

(51) Int. Cl.
*G11B 20/10* (2006.01)

(52) U.S. Cl. ............... 369/53.12; 369/53.15; 369/44.32; 369/53.28

(58) Field of Classification Search .............. 369/53.1, 369/53.12, 53.15–53.17, 53.25, 53.28, 53.31, 369/53.35, 44.32, 59.21, 124.05
See application file for complete search history.

(56) References Cited

U.S. PATENT DOCUMENTS

| | | | | |
|---|---|---|---|---|
| 6,018,431 A | * | 1/2000 | Carlson et al. | 369/47.32 |
| 7,095,690 B2 | * | 8/2006 | Ikeda et al. | 369/47.52 |
| 2004/0208099 A1 | * | 10/2004 | Nakata | 369/53.35 |

* cited by examiner

*Primary Examiner*—Thang V Tran
(74) *Attorney, Agent, or Firm*—Jimmy L. Funke (57) ABSTRACT

A system and methods for evaluating the response of an optical digital disk player to anomalies in optical digital disks are provided. The system includes a simulator configured to provide digital simulated output signals simulating the output of an optical digital disk player during playback of an optical digital disk having an anomaly. The system also includes digital-to-analog converter circuitry to convert the digital simulated output signals to analog simulated output signals and provide the analog simulated output signals to processing circuitry. The processing circuitry generates control signals based on the value of the analog simulated output signals, and provides the control signals as outputs.

22 Claims, 4 Drawing Sheets

METHOD AND SYSTEM FOR EVALUATING CD PLAYER RESPONSE TO ANOMALIES IN A CD

TECHNICAL FIELD

The present invention is generally directed to optical digital disk player testing systems and methods, and, more specifically, to a system and method for testing the response of optical digital disk players to anomalies in optical digital disks.

BACKGROUND OF THE INVENTION

Optical digital disk players, such as, for example, audio compact disk (CD) players, are frequently employed in automobiles as a means for providing audio entertainment to vehicle occupants. To enhance the listening experience of vehicle occupants, CD players are typically designed to compensate for anomalies that can be encountered during the audio CD playback process that might otherwise act to interrupt and/or distort the audio produced during the CD playback process. Examples of anomalies that can be encountered during the CD playback process include defects on the CD itself, such as, for example, scratches, smudges, spots, manufacturing defects and/or dirt located on the surface of the CD. Other anomalies that can be encountered during the audio CD playback process include physical shocks and vibrations introduced into the CD player. While anomalies on the surface of audio CDs are not unique to the automotive environment, and can also impact the playback of audio CDs in home or portable CD systems, shock and vibration can be especially prevalent and problematic in an automotive environment in which a vehicle is often traveling at a high rate of speed over a rough road surface.

Figure 1:
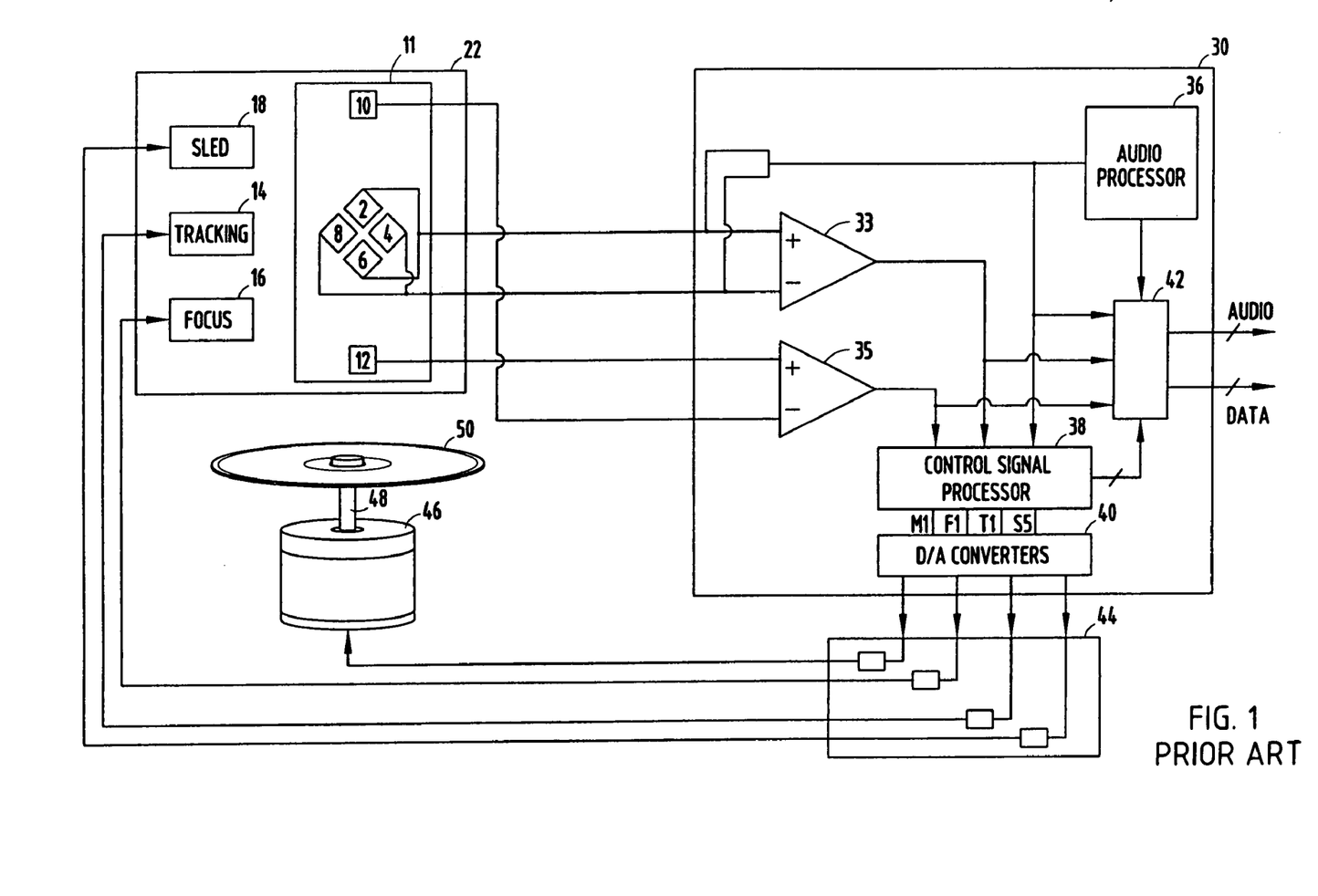
FIG. 1 is a block diagram of a conventional CD player that is generally known.

The anomalies discussed above can act to prevent the pickup mechanism of the CD player from accurately reading and/or interpreting data stored on the CD. In order to reduce the negative impact of such anomalies on the quality of playback, CD player components, including the pickup mechanism and CD player processing circuitry, are typically designed to adapt to anomalies as they are encountered during the playback process. FIG. 1 generally illustrates components typically included in a conventional CD player 20. CD player 20 includes a laser diode (not shown) for projecting a light beam on a surface of a CD 50 placed in the CD player 20. CD player 20 also includes a pickup mechanism 22 for reading signals from the CD 50 and providing them to additional circuitry in the CD player 20 for processing. As shown, pickup mechanism 22 includes a photosensor 11, sled adjustment mechanism 18, tracking adjustment mechanism 14 and focus adjustment mechanism 16. Sled adjustment mechanism 18, tracking adjustment mechanism 14, and focus adjustment mechanism 16 are configured to control the position of pickup mechanism 22 relative to the surface of CD 50. Photosensor 11 includes an array of photo diodes 2, 4, 6, 8, 10 and 12 for detecting light reflected from the surface of the CD 50 and providing analog output signals indicative of the light received by the photo diodes 2, 4, 6, 8, 10 and 12. Photo diodes 10 and 12 are configured to determine the tracking status of pickup mechanism 11. Photo diodes 2, 4, 6, and 8 are configured to read audio data and, in addition, provide signals indicative of the focus status of pickup mechanism 11. Pickup mechanism 22 is configured to be positioned relative to CD 50 by sled adjustment mechanism 18, tracking adjustment mechanism 14 and focus adjustment mechanism 16 in order to accurately read data contained on CD 50.

As shown, the output signals of photo diodes 2 and 6 are combined into a first combined output signal of photo sensor 11, while the output signals of photo diodes 4 and 8 are combined into a second combined output signal of photosensor 11. The first combined output signal, second combined output signal, and output signals provided by tracking photo diodes 10 and 12 are shown provided to Audio/data processing circuitry 30 of CD player 20 for processing. Audio/data processing circuitry 30 is configured to extract high-frequency (HF) audio, focus, and tracking data from the output signals provided by photosensor 11 of pickup mechanism 22. Audio/data processing circuitry 30 is configured to provide audio and/or data to circuitry external to audio/data processing circuitry 30 (not shown) for processing. Audio/data processing circuitry 30 processes extracted HF audio data to provide audio signals that are ultimately provided as audio output to users of the CD player 20. Audio/data processing circuitry 30 is also configured to process focus and tracking data from photosensor 11 to evaluate the operation of pickup mechanism 22 and generate control signals based on the focus and tracking data. The control signals generated by audio/data processing circuitry 30 are provided to drive motor 46, and to sled adjustment mechanism 18, tracking adjustment mechanism 14, and focus adjustment mechanism 16 of pickup mechanism 22, and are used to control those devices to optimize the quality of audio/data output provided by CD player 20 during playback of a CD 50. As shown, the control signals include motor control signals M1, focus control signals F1, tracking control signals T1, and sled control signals S5.

One conventional method typically used to optimize how the CD player 20 generally illustrated in FIG. 1 responds to anomalies is to monitor the audio/data output of the CD player 20 for skip and/or mute conditions during an anomaly that occurs during playback of a CD 50. A skip condition is a condition in which the audio output of a CD player 20 that is playing an audio program is muted for a period of time due to an anomaly (such as, for example, a vibration or scratch), after which period of time the audio output of the CD player 20 resumes at a different point in the audio program than when the mute first occurred. This effectively results in audio material of the CD being skipped as a result of the anomaly, and is generally an undesirable condition. A mute condition is similar to a skip condition, with the main difference being that the CD player 20 resumes playback of the audio program at the same point where the mute first occurred. While undesirable, this condition is less problematic than a skip condition, because little to no audio material is omitted during playback. CD player system designers typically attempt to design a system in which skip and or mute conditions are avoided in spite of the occurrence of anomalies during playback of a CD 50.

As noted above, anomalies can include defects in the disk itself, or environmental factors to which the CD player is exposed during playback. For example, in order to monitor the components and/or signals during a "disk defect" anomaly, a CD played in a CD player 20 may be a test CD including defects on the disk surface, such as scratches and/or dirt. When the CD player 20 encounters these defects on the test CD, the audio/data signals are monitored to determine how well the CD player 20 responds to the given anomaly. In order to monitor the performance of components and/or signals during an "environmental" anomaly, such as vibration, the CD player 20 is vibrated while a CD 50 is played. By monitoring the audio/data signals while the CD player 20 is being vibrated, the response of the CD player 20 to the vibration is determined.

Once the response of the CD player 20 to anomalies has been determined, changes and/or adjustments are made to components and/or circuitry of the CD player 20 in order to attempt to improve the response of the CD player 20 to anomalies. Once changes have been made, the CD player 20 can again be operated in the presence of anomalies, and the audio/data signals monitored to determine if further adjustments are needed to further improve the system performance. In this iterative manner, components and circuitry of CD player 20 can be adapted to provide an improved listening experience for the user of the CD player.

While the aforementioned conventional approach of generating anomalies by means of CDs having defects (test CDs) or by means of physically manipulating the CD player by introducing physical shocks and/or vibrations can provide useful information for optimization of the CD player design, it does have drawbacks. For example, test CDs designed to have specific defects for use in CD player testing can be expensive, and are typically subject to breakdown over periods of repeated use, requiring the purchase of additional expensive testing CDs. In addition, physically vibrating and/or manipulating the CD player while it is playing a CD during repeated testing iterations can expose both the test CD and CD player itself to physical damage. Finally, the need to swap multiple test CDs having various defects in and out of a CD player 20 during iterative test cycles can be time consuming and labor intensive.

What is needed is a CD player testing system and method that reduces the dependence on test CDs and physical manipulation of the CD player being tested, and that reduces the need for repeated insertion and removal of test CDs during iterative test cycles.

SUMMARY OF THE INVENTION

In accordance with one aspect of the present invention, a system for evaluating the response of optical digital disk player components to anomalies in an optical digital disk is provided. The system includes a simulator configured to generate a digital simulated output signal simulating an output of an optical digital disk player during playback of an optical digital disk having defects. The system also includes a digital-to-analog converter coupled to the simulator and configured to convert the digital simulated output signal to an analog simulated output signal, and processing circuitry coupled to the digital-to-analog converter and configured to receive the analog simulated output signal from the digital-to-analog converter. The processing circuitry provides control signals as outputs based on the value of the analog simulated output signal.

In accordance with another aspect of the present invention, a system for evaluating the response of an optical digital disk player to anomalies encountered during playback of an optical digital disk is provided. The system includes a simulator configured to generate a digital simulated output signal simulating an output of an optical digital disk player encountering an anomaly during playback of an optical digital disk. The system also includes a digital-to-analog converter coupled to the simulator and configured to convert the digital simulated output signal to an analog simulated output signal, and processing circuitry coupled to the digital-to-analog converter and configured to receive the analog simulated output signal from the digital-to-analog converter. The processing circuitry provides control signals as outputs based on the value of the analog simulated output signal.

In accordance with another aspect of the present invention, a method for evaluating the response of an optical digital disk player to anomalies is provided. The method includes the steps of coupling simulator circuitry to processing circuitry configured to process signals from an optical digital disk player pickup mechanism, and creating in the simulator circuitry a simulated anomaly signal simulating anomaly waveform characteristics provided by an optical digital disk player encountering an anomaly during playback of an optical digital disk. The method further includes the steps of providing the simulated signal to the processing circuitry and processing the simulated signal in the processing circuitry to generate at least one control signal.

In accordance with still another aspect of the present invention, a method for evaluating the response of audio compact disk player circuitry to anomalies in an audio compact disk is provided. The method includes the steps of coupling simulator circuitry to processing circuitry configured to process signals provided by an audio compact disk player. The method also includes the step of creating in the simulator circuitry a simulated anomaly signal simulating waveform characteristics provided as an output signal by a pickup mechanism of an audio compact disk player during playback of an audio compact disk having a defect. The method further includes the steps of providing the simulated signal to the processing circuitry, processing the simulated anomaly signal in the processing circuitry to generate at least one control signal that is a function of the simulated anomaly signal, and monitoring the at least one control signal to evaluate the response of the processing circuitry to the simulated anomaly signal.

These and other features, advantages, and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Although the preferred embodiments are directed to audio CDs and audio CD players, it should be appreciated that the present invention applies generally to other optical digital disks and optical digital disk players. Examples of other media and players to which the invention is directed include, for example, DVDs and DVD recorders and/or players, writeable and rewriteable CDs and writers/players, and other optical digital disks configured to store digital data on a disk and the associated players.

Figure 2:
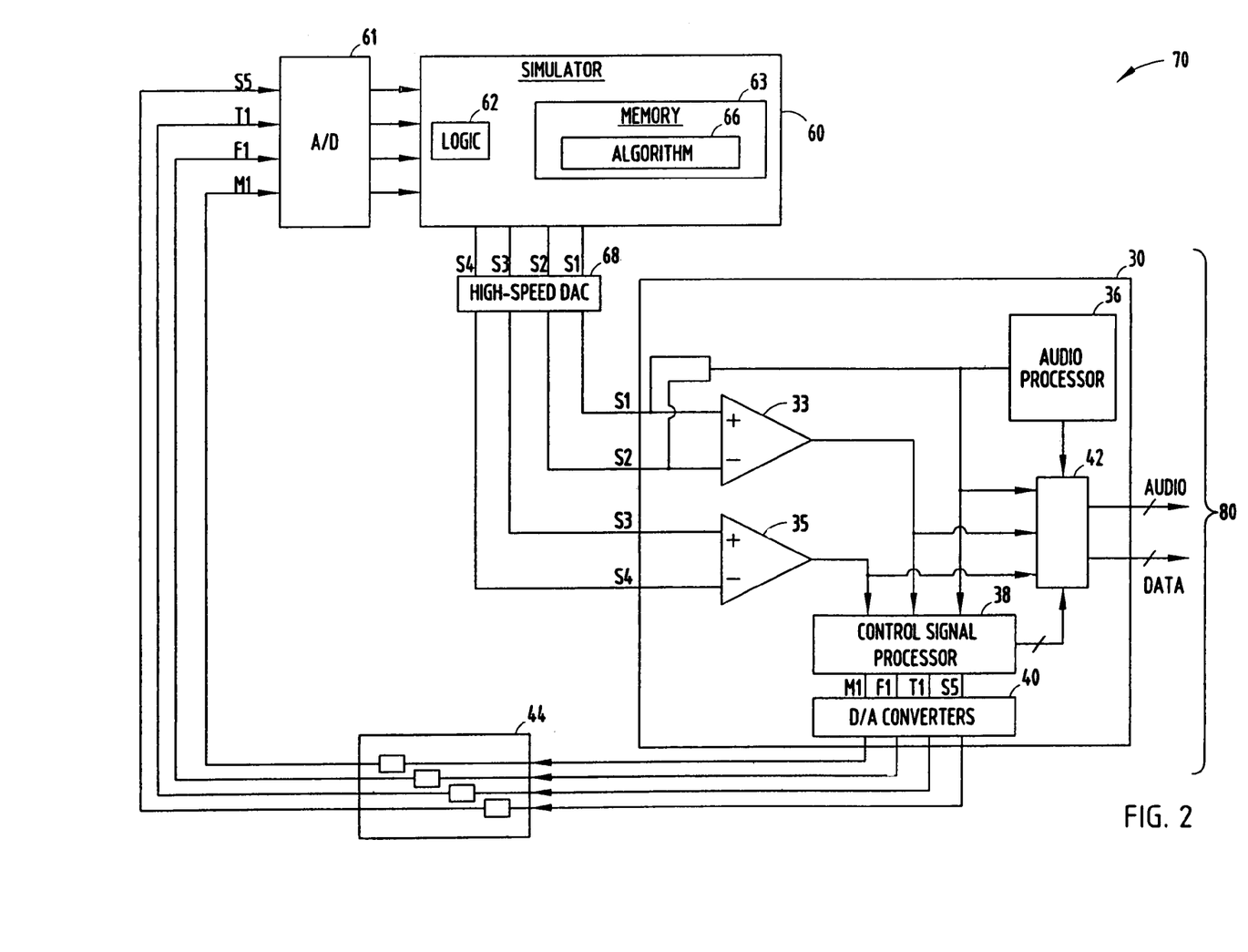
FIG. 2 is a block diagram generally illustrating an optical digital disk test system, according to one embodiment of the present invention.

Referring to FIG. 2, a system 70 for evaluating the response of an optical digital disk player to anomalies is generally illustrated, according to one embodiment of the present invention. In the present embodiment, the system 70 includes a simulator 60 having logic 62, memory 63, and at least one algorithm 66 located in the memory 63. The logic 62 is configured to operate responsive to the algorithm 66 stored in the memory 63 of simulator 60 to monitor signals, process signals, and generate simulated signals. In the present embodiment, simulator 60 is a computer. It should be appreciated that in an alternate embodiment, simulator 60 could be implemented in a hardware-only configuration, without software. In the present embodiment, the simulated signals generated by simulator 60 are digital simulated signals. In an alternate embodiment, the simulated signals may be analog signals.

Simulator 60 is shown coupled to high-speed digital-to-analog converter circuitry 68. High-speed digital-to-analog converter circuitry 68 is configured to receive digital simulated signals from simulator 60, convert the digital simulated signals to analog simulated signals, and provide the resulting analog simulated signals to circuitry coupled to high-speed digital-to-analog converter circuitry 68. In the present embodiment, simulator 60 is also shown coupled to analog-to-digital converter circuitry 61, which is also coupled to audio/data processing circuitry 30. Analog-to-digital converter circuitry 61 is configured to receive electrical control signals from audio/data processing circuitry 30, convert the received control signals to digital signals, and provide the digital control signals to simulator 60. In an alternate embodiment, audio/data processing circuitry 30 may provide control signals directly to simulator 60.

As noted above, simulator 60 is configured to generate digital simulated signals. The digital simulated signals provided by simulator 60 to high-speed digital-to-analog converter circuitry 68 are configured to simulate photo diode signals that would be provided by photodiodes 2-12 of photosensor 11 of CD player 20 of FIG. 1 that is playing a CD 50 during the occurrence of an anomaly. In one exemplary embodiment, the anomaly is a disk defect, and the digital simulated signals provided by simulator 60 are configured to simulate signals provided by a CD photosensor 11 when a test CD 50 having a defect is being played back by the CD player 20 of FIG. 1. In another exemplary embodiment, the anomaly is a physical shock introduced into the CD player 20 of FIG. 1, and the digital simulated signals provided by simulator 60 are configured to simulate the output of a CD photosensor 11 when a CD player 20 of FIG. 1 playing a CD 50 is exposed to a physical shock, such as, for example, a vibration. In the present embodiment, the digital simulated photosensor signals are created by an algorithm 66 running on simulator 60, and are created based on photosensor data provided by a CD player 20 of FIG. 1 operating under anomaly conditions. In operation, high-speed digital-to-analog converter circuitry 68 receives the digital simulated photosensor signals, and converts them into analog simulated photosensor signals. The resulting waveforms of the analog simulated photosensor signals closely match the analog waveforms of actual photosensor signals that would be provided by a photosensor of a CD player 20 of FIG. 1 playing a CD 50 in an anomaly condition.

In one embodiment of the present invention, four simulated photosensor signals, designated as S1-S4 in FIG. 2, are shown provided by simulator 60 to high-speed digital-to-analog converter circuitry 68. A first simulated photosensor signal S1 simulates the combined output of the two photo diodes 2 and 6 in the photosensor 11 of CD player 20 of FIG. 1 during an anomaly condition. The photo diodes 2 and 6 that are simulated are photo diodes normally providing an output signal representative of both the focus condition of the photosensor 11 of FIG. 1, and audio data detected by the photo diodes 2 and 6 of the photosensor 11.

The second simulated signal S2 provided by simulator 60 to high-speed digital-to-analog converter circuitry 68 is a signal simulating the combined output of two additional photo diodes 4 and 8 in photosensor 11 of CD player 20 of FIG. 1 during an anomaly condition. These two additional photo diodes 4 and 8 in photosensor 11 of CD player 20 normally provide a combined output signal representative of both the focus condition of the photosensor and audio data detected by the photo diodes 4 and 8 of photosensor 11 of FIG. 1.

The third simulated signal S3 provided by simulator 60 to high-speed digital-to-analog converter circuitry 68 is a simulated signal representing the output of a fifth photo diode 10 in a photosensor 11 of CD player of FIG. 1 during an anomaly condition. This fifth photo diode 10 provides a signal that is representative of the tracking condition of the photosensor 11 of the CD player 20.

The fourth simulated signal S4 provided by simulator 60 to high-speed digital-to-analog converter circuitry 68 is a signal simulating the output of a sixth photo diode 12 in a photosensor 11 of CD player 20 of FIG. 1 during an anomaly condition. This fourth simulated signal S4 is indicative of the tracking state of the photosensor 11 of the CD player 20.

As noted above, high-speed digital-to-analog converter circuitry 68 receives the digital simulated signals S1-S4 from simulator 60, and converts the digital simulated signals into analog simulated signals S1-S4. After the analog simulated signals S1-S4 have been converted into analog signals, the signals closely approximate the analog output waveforms of photodiodes 2-12 of photosensor 11 of a CD player 20 of FIG. 1 that is playing a CD in an anomaly condition. The first and second analog simulated signals S1 and S2 include both focus error information and audio information, while the third and fourth analog simulated signals S3 and S4 include tracking error information.

The analog simulated signals S1-S4 are shown input to audio/data processing circuitry 30. In the present embodiment, audio/data processing 30 is processing circuitry configured to process audio and data signals provided by an audio CD player pickup mechanism. In an alternate embodiment, audio/data processing circuitry 30 is processing circuitry configured to process audio and/or data provided by other optical digital disk player pickup mechanisms. Audio/data processing circuitry 30 includes comparator circuitry 33, comparator circuitry 35, audio processing circuitry 36, control signal processing circuitry 38, digital-to-analog converter circuitry 40, and data output circuitry 42. As shown, the first and second analog simulated signals S1 and S2 containing focus and audio information are processed by comparator 33 and audio processing circuitry 36 after being received by audio/data processing circuitry 30. The signals processed by audio processing circuitry 36 are HF audio signals formed by combining the first simulated analog signal S1 with the second simulated analog signal S2 prior to providing the resulting HF audio signal to audio processing circuitry 36. Audio processing circuitry 36 processes the HF audio signal formed by combining the first simulated analog signal S1 with the second simulated analog signal S2 to extract audio information such as, for example, music. Audio processing circuitry 36 is also shown coupled to data output circuitry 42. The audio information provided by audio processing circuitry 36 is provided to data output circuitry 42, where the audio information is additionally processed and provided to additional circuitry (not shown) to convert the audio information into a format that can be perceived by the human ear.

The first and second simulated analog signals S1 and S2 are also input to comparator circuitry 33 of processing circuitry 30. Comparator circuitry 33 compares the value of the first and second simulated analog signals S1 and S2 to determine if they are indicative of a photosensor 11 of FIG. 1 that is out of focus. If the difference between the first and second simulated analog signals S1 and S2 is approximately zero, there is little or no focus error, and focus adjustment of the pickup mechanism 22 of the CD player 20 of FIG. 1 is not necessary. If, however, there is a difference between the values of the first simulated analog signal S1 and second simulated analog signal S2, a focus error is present, indicating that adjustment of the pickup mechanism 22 of the CD player 20 may be necessary.

High-speed digital-to-analog converter circuitry 68 is also shown providing third and fourth simulated analog signals S3 and S4 to audio data processing circuitry 30. More specifically, third and fourth simulated analog signals S3 and S4 are provided to comparator circuitry 35 of audio/data processing circuitry 30, and are compared to determine if there is a difference between the two signals S3 and S4. If there is no difference between the third and fourth simulated analog signals S3 and S4, there is little or no tracking error, and adjustment of the pickup mechanism 22 of the CD player 20 of FIG. 1 is unnecessary. If, however, there is a difference between the value of the third and fourth simulated analog signals S3 and S4, a tracking error is present, and an adjustment of pickup mechanism 22 of the CD player 20 may be necessary.

Audio/data processing circuitry 30 is also shown including control signal processing circuitry 38. Control signal processing circuitry 38 is electrically coupled to comparator circuitry 35 and comparator circuitry 33. Control signal processing circuitry 38 is also shown receiving the HF audio signal that is provided to audio processing circuitry 36. Control signal processing circuitry 38 is configured to process an electrical signal received from comparator circuitry 35 to determine, based on the value of that signal, if there is a tracking error detected by photosensor 11 of pickup mechanism 22 of the CD player 20 of FIG. 1. If control signal processing circuitry 38 determines, based on a tracking error signal received from comparator circuitry 35, that there is a tracking error present, control signal processing circuitry 38 generates a tracking control signal T1. In the present embodiment, control signal T1 is configured to control a tracking adjustment mechanism of an optical digital disk player, such as, for example, tracking adjustment mechanism 14 of pickup mechanism 22 of CD player 20 of FIG. 1, to adjust the tracking of the optical digital disk player.

Control signal processing circuitry 38 is also shown receiving a focus error signal from comparator circuitry 33. Control signal processing circuitry 38 is configured to evaluate the focus error signal received from comparator circuitry 33 to determine if a focus error is present. If control signal processing circuitry 38 determines that a focus error is present, control signal processing circuitry 38 generates a focus control signal F1. In the present embodiment, control signal F1 is configured to control a focus adjustment mechanism of an optical digital disk player, such as, for example, focus adjustment mechanism 16 of pickup mechanism 22 of CD player 20 of FIG. 1, to adjust the focus of the optical digital disk player.

Control signal processing circuitry 38 is also shown receiving an HF audio signal that has been provided to audio/data processing circuitry 30 by high-speed digital-to-analog converter circuitry 68. Control signal processing circuitry 38 evaluates the HF audio signal alone, or in combination with, other signals, such as the focus error signal from comparator circuitry 33 and/or the tracking error signal from comparator circuitry 35, to additionally evaluate whether focus, tracking, or other errors are present.

In addition to providing the control signals discussed above with respect to tracking adjustment and focus adjustment, control signal processing circuitry 38 is also configured to generate a sled adjustment control signal S5. In the present embodiment, control signal S5 is configured to control a sled adjustment mechanism of an optical digital disk player, such as, for example, sled adjustment mechanism 18 of pickup mechanism 22 of CD player 20 of FIG. 1. Finally, control signal processing circuitry 38 is also configured to generate motor control signals M1. In the present embodiment, control signal M1 is configured to control the speed and direction of rotation of a spindle drive motor, such as, for example, spindle drive motor 46 of CD player 20 of FIG. 1.

Audio/data processing circuitry 30 is also shown having I/O circuitry 42 for allowing control signals and/or data to be provided to audio/data processing circuitry 30 from external circuitry (not shown), and to allow data and/or control signals to be provided to external circuitry (not shown) from audio/data processing circuitry 30. I/O circuitry 42 is shown coupled to control signal processing circuitry 38, audio processing circuitry 36, comparator circuitry 33, and comparator circuitry 35. In this manner, HF audio signals, focus error signals provided by comparator circuitry 33, tracking error signals provided by comparator circuitry 35, and control signals provided by control signal processing circuitry 38 may be monitored by external circuitry coupled to audio/data processing circuitry 30 via I/O circuitry 42. Audio and/or other data provided via I/O circuitry 42 may also be monitored for skip conditions, mute conditions, and other conditions of interest to a user to evaluate how the processing circuitry 30 responds to various anomalies.

Control signal processing circuitry 38 is also shown coupled to digital-to-analog converter circuitry 40. As shown, digital-to-analog converter circuitry 40 receives digital control signals M1, F1, T1 and S5 provided by control signal processing circuitry 38, and converts the digital control signals into analog control signals before providing those signals as an output from audio/data processing circuitry 30 to additional circuitry coupled to audio/data processing circuitry 30.

In the present embodiment, the system 70 is also shown including driver control circuitry 44 coupled to audio/data processing circuitry 30. As shown, driver control circuitry 44 is configured to receive control signals provided by audio/data processing circuitry 30, and convert those control signals into analog signals that can be directly used by the devices to which those signals are provided. As shown, driver control circuitry 44 receives four signals from digital-to-analog converter circuitry 40 of audio/data processing circuitry 30. These signals include motor control signals M1, focus control signals F1, tracking control signals T1, and sled control signals S5. The motor control signals M1 provided by digital-to-analog circuitry 40 of audio/data processing circuitry 30 are received by driver circuitry 44 and converted to signal levels and formats directly usable by a spindle drive motor, such as, for example, spindle drive motor 46 of FIG. 1, to control the direction and speed of rotation of spindle drive motor 46.

Driver control circuitry 44 is also shown receiving tracking control signals T1 from digital-to-analog converter circuitry 40 of audio/data processing circuitry 30. Driver control circuitry 44 converts the received analog tracking control signals T1 into control signals configured to be directly used to control a tracking adjustment mechanism, such as, for example, tracking adjustment mechanism 14 of pickup mechanism 22 of FIG. 1, to control the tracking of pickup mechanism 22.

Driver control circuitry 44 is also shown receiving focus control signals F1 from digital-to-analog converter circuitry 40 of audio/data processing circuitry 30. Driver control circuitry 44 receives the analog focus control signals F1, converts the focus control signals F1 into signals configured to be directly used to control a focus adjustment mechanism, such as, for example, the focus adjustment mechanism 16 of pickup mechanism 22 of FIG. 1, to control the focus of pickup mechanism 22.

Driver circuitry 44 is also shown receiving analog sled control signals S5 from digital-to-analog converter circuitry 40 of audio/data processing circuitry 30. Driver circuitry 44 converts the received analog sled control signals S5 into sled control signals S5 configured to be directly used to control the operation of a sled adjustment mechanism, such as sled adjustment mechanism 18 of pickup mechanism 22 of FIG. 1, to control the position of pickup mechanism 22.

In the present embodiment, the control signals M1, F1, T1 and S5, configured as discussed above, are provided as inputs to analog-to-digital converter circuitry 61, where they are converted into digital form. In an alternate embodiment, the control signals M1, F1, T1 and S5 are provided directly from audio/data processing circuitry 30 to analog-to-digital converter circuitry 21, without first passing through driver circuitry 44. In still another embodiment, the control signals M1, F1, T1 and S5 are provided directly from audio/data processing circuitry 30 to simulator 60 without passing through driver circuitry 44 or analog-to-digital converter circuitry 61.

In the present embodiment, simulator 60, in addition to being configured to provide the digital simulated signals discussed above, is also configured to simulate a response of a tracking adjustment mechanism, focus adjustment mechanism, sled adjustment mechanism, and spindle drive motor to the control signals T1, F1, S5, and M1, respectively, provided by analog-to-digital converter circuitry 61. In this manner, simulator 60 can determine how tracking adjustment mechanisms, focus adjustment mechanisms, sled adjustment mechanisms, and spindle drive motors of optical digital disk players would likely respond to the control signals generated by processing circuitry 30. Based on the determination, adjustments can be made to the processing circuitry 30 to obtain the desired response.

In addition to monitoring the simulated response of the mechanisms and motors as described above, simulator 60 is also configured to monitor the control signals T1, F1, S5 and M1 provided by analog-to-digital converter circuitry 61. By monitoring these control signals, simulator 60 can determine how processing circuitry 30 is responding to the simulated digital input. By comparing the values of the control signals with the desired values, adjustments can be made to processing circuitry 30 such that the desired control signals occur based on certain simulated digital inputs.

Finally, in addition to being able to monitor both the values of the control signals and the simulated response of the mechanism and motors to the control signals, simulator 60 is also configured to alter the simulated digital signals it is creating based on the simulated response of the mechanism and motors, the values of the control signals, or both. In this manner, real time feedback based on the control signals generated by signal processing circuitry 30 and their impact on simulated mechanism and motors can be used to dynamically adjust the simulated digital signals to help determine the optimal characteristics of signal processing circuitry 30.

In this manner, simulator 60 monitors the response of the control signals T1, M1, S5 and F1 to the simulated input signals S1-S4 provided by simulator 60. Simulator 60 can use the monitored values of the control signals to alter the values of the simulated signals S1-S4 provided to audio/data processing circuitry 30 by simulator 60 via high-speed digital-to-analog converter circuitry 68.

In operation, simulator 60 runs a software algorithm 66, which causes simulator 60 to generate digital simulated waveform signals S1-S4. Simulated waveform signals S1-S4 are representative of photo diode signals that would be provided by a photosensor 11 of the CD player 20 of FIG. 1 if the CD player 20 encountered an anomaly during the playback of a CD 50. It should be appreciated that algorithm 66 may be configured such that a single anomaly is simulated, multiple anomalies are simulated sequentially, or multiple anomalies are simulated simultaneously by simulator 60.

The simulated digital waveform signals S1-S4 are converted into analog simulated waveform signals S1-S4 by high-speed digital-to-analog converter circuitry 68. Simulated analog waveform signals S1-S4 are then provided to audio/data processing circuitry 30 for additional processing. The simulated analog waveform signals S1-S4 are used to provide HF audio signals, which are decoded by audio processing circuitry 36 to provide audio signals for a user of the system. The simulated analog waveform signals are also used to extract focus error information and tracking error information indicative of whether there is a focus and/or tracking error based on the simulated analog waveform signal. The HF audio focus error and tracking error signals are provided to control signal processing circuitry 38, which evaluates the signals to determine if there is a focus error, tracking error, and/or other error based on the received simulated analog signals.

Control signal processing circuitry 38 generates control signals to correct identified errors. These control signals include motor control signals M1 configured to control the speed and direction of a drive motor of an optical digital disk player, focus control signals F1 configured to control a focus adjustment mechanism of an optical digital disk player, tracking control signals T1 configured to control a tracking adjustment mechanism of an optical digital disk player, and sled control signals S5 configured to control a sled adjustment mechanism of an optical digital disk player. These control signals are converted from digital to analog form by digital-to-analog converter circuitry 40, processed by driver circuitry 44 to convert the signals to formats capable of controlling other components of CD player 20 of FIG. 1, and then provided to simulator 60.

Simulator 60 monitors the values of the focus control signals F1, tracking control signals T1, sled control signals S5, and motor control signals M1 to evaluate the response of processing circuitry 30 to the simulated signals S1-S4 provided by algorithm 66. Simulator 60 may also adjust the value of the simulated signals S1-S4 provided by algorithm 66 based on the value of the monitored control signals F1, T1, M1 and S5. In addition, simulator 60 simulates the response of the various mechanisms and motors to the control signals F1, T1, M1 and S5, monitors these simulated responses, and adjusts the value of the simulated signals S1-S4 provided by algorithm 66 based on the monitored simulated response. By providing simulated signals S1-S4 that simulate various error and/or anomaly conditions, such as, for example, defects on the surface of a CD 50 being played in a CD player 20 of FIG. 1, or situations in which CD player 80 is exposed to vibration, and by monitoring the resulting control signals and simulated responses of system components to those control signals, a user of the system 70 can determine how to optimize system components and/or processing steps and parameters employed in audio/data processing circuitry 30 to improve the response of the CD player 20 to anomalies, such as defects in the CD and/or environmental vibrations, or other environmental factors. This can be accomplished without exposing the system 70 to actual defective disks or vibrations, and can also be accomplished in an automated fashion by configuring simulator 60 to sequence through a number of "anomaly" scenarios without user intervention.

Figure 3:
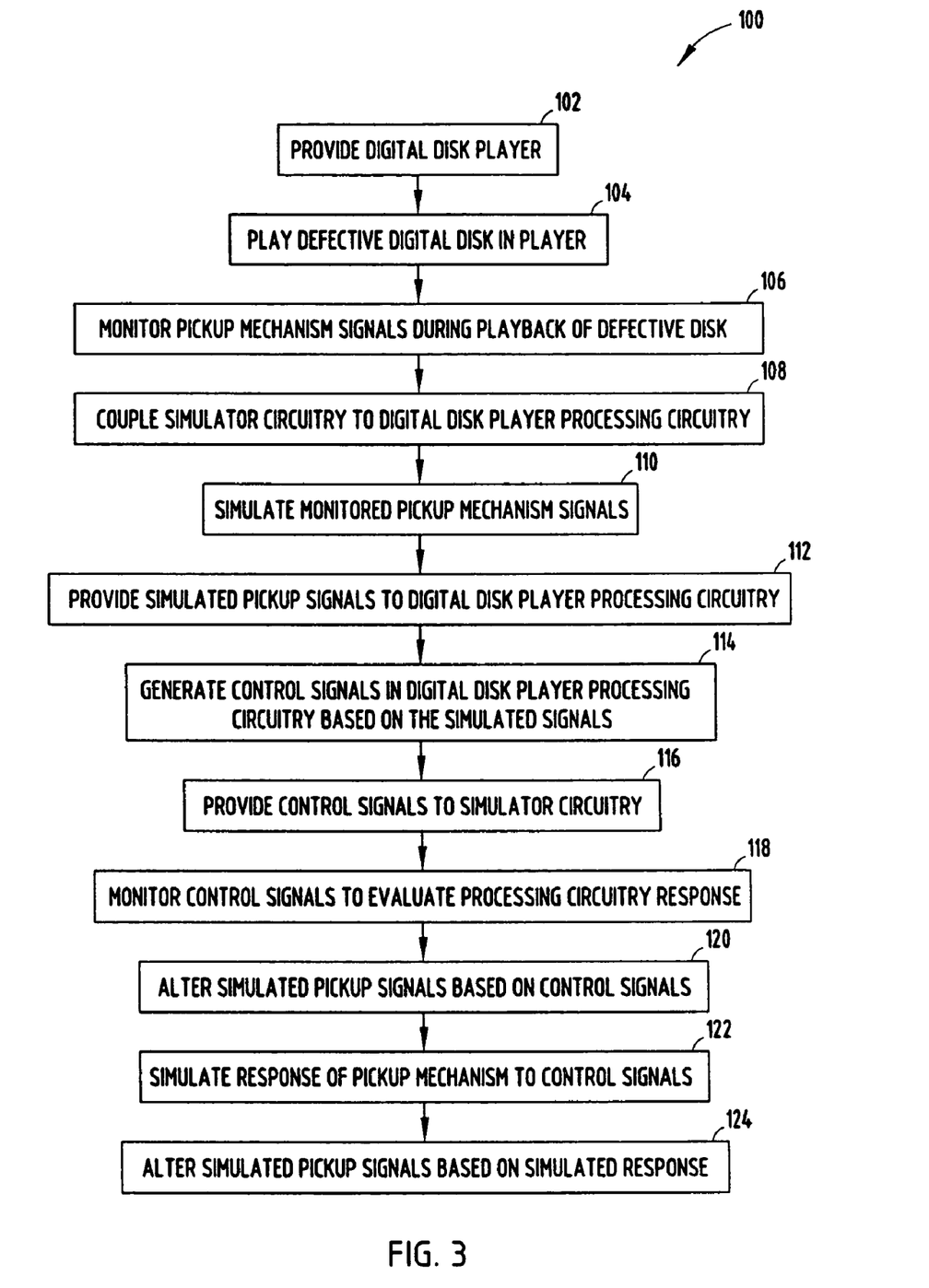
FIG. 3 is a flow diagram generally illustrating a first embodiment of a method for testing an optical digital disk player, according to the present invention.

FIG. 3 generally illustrates a method 100 for evaluating the response of optical digital disk player circuitry to anomalies. In a first step 102 of the method 100, an optical digital disk player is provided. In the present embodiment, the optical digital disk player is an audio CD player configured to play an audio CD. In an alternate embodiment, the optical digital disk player is a player capable of optically extracting digital data from an optical digital disk, including, for example, CD-ROM drives, rewritable CD drives, DVD players, and DVD writers.

In a second step 104 of the method 100, an optical digital disk that is an audio CD having anomalies is played in the CD player provided in step 102. In the present embodiment, the anomalies are defects on the surface of the audio CD that is being played, and include, for example, scratches and/or dirt on the surface of the audio CD. In an alternate embodiment in which an optical digital disk player other than an audio CD player is employed in the method, the optical digital disk having anomalies may include an audio CD, or an optical digital disk other than an audio CD, such as, for example, a DVD.

In a third step 106 of the method 100, signals provided by the pickup mechanism of the audio CD player are monitored while an audio CD having anomalies is being played to identify unique signal characteristics of the pickup mechanism associated with the playback of an audio CD having an anomaly. It should be appreciated that the pickup mechanism signals can be captured electronically, such as, for example, by a digital oscilloscope, so that they can be retrieved for later analysis and review. In an alternate embodiment, the signals provided by the pickup mechanism of an optical digital disk player are monitored while an optical digital disk other than an audio CD having anomalies is being played to identify unique signal characteristics of the pickup mechanism associated with the playback of an optical digital disk having an anomaly.

In a fourth step 108 of the method 100, simulator circuitry is coupled to optical digital disk processing circuitry configured to process audio and/or data provided by an optical digital disk player pickup mechanism. In the present embodiment, the optical digital disk processing circuitry is audio CD processing circuitry configured to process audio and/or data provided by an audio CD player pickup mechanism.

In a fifth step 110 of the method 100, simulated pickup mechanism signals are created by the simulator circuitry, such that the simulated pickup mechanism signals substantially resemble pickup mechanism signals generated by an optical digital disk player playing an optical digital disk having an anomaly. In the present embodiment, the simulated pickup mechanism signals substantially resemble pickup mechanism signals generated by an audio CD player playing an audio CD having an anomaly.

In a sixth step 112 of the method 100, the simulated pickup mechanism signals are provided to the processing circuitry.

In a seventh step 114 of the method 100, the processing circuitry to which the simulated pickup mechanism signals have been provided generates control signals, based on the simulated pickup mechanism signals. The control signals are configured to control motors and/or mechanisms of optical digital disk players. In the present embodiment, the control signals generated include tracking, focus, sled and motor control signals.

In an eighth step 116 of the method 100, the control signals are provided to the simulator circuitry. In an alternate embodiment, the control signals are first provided to analog-to-digital converter circuitry prior to being provided to the simulator circuitry.

In a ninth step 118 of the method 100, the control signals are monitored by the simulator circuitry to evaluate the response of the processing circuitry to the simulated pickup mechanism signals.

In a tenth step 120 of the method 100, the simulated pickup mechanism signals are modified by the simulator circuitry based on the control signals.

In an eleventh step 122 of the method 100, the simulator circuitry simulates the response of a pickup mechanism of an optical digital disk player to the control signals. In the present embodiment, the simulator circuitry simulates the response of a pickup mechanism of an audio CD player to the control signals.

In a twelfth step 124 of the method 100, the simulated pickup mechanism signals are modified based on the simulated response of the pickup mechanism.

Figure 4:
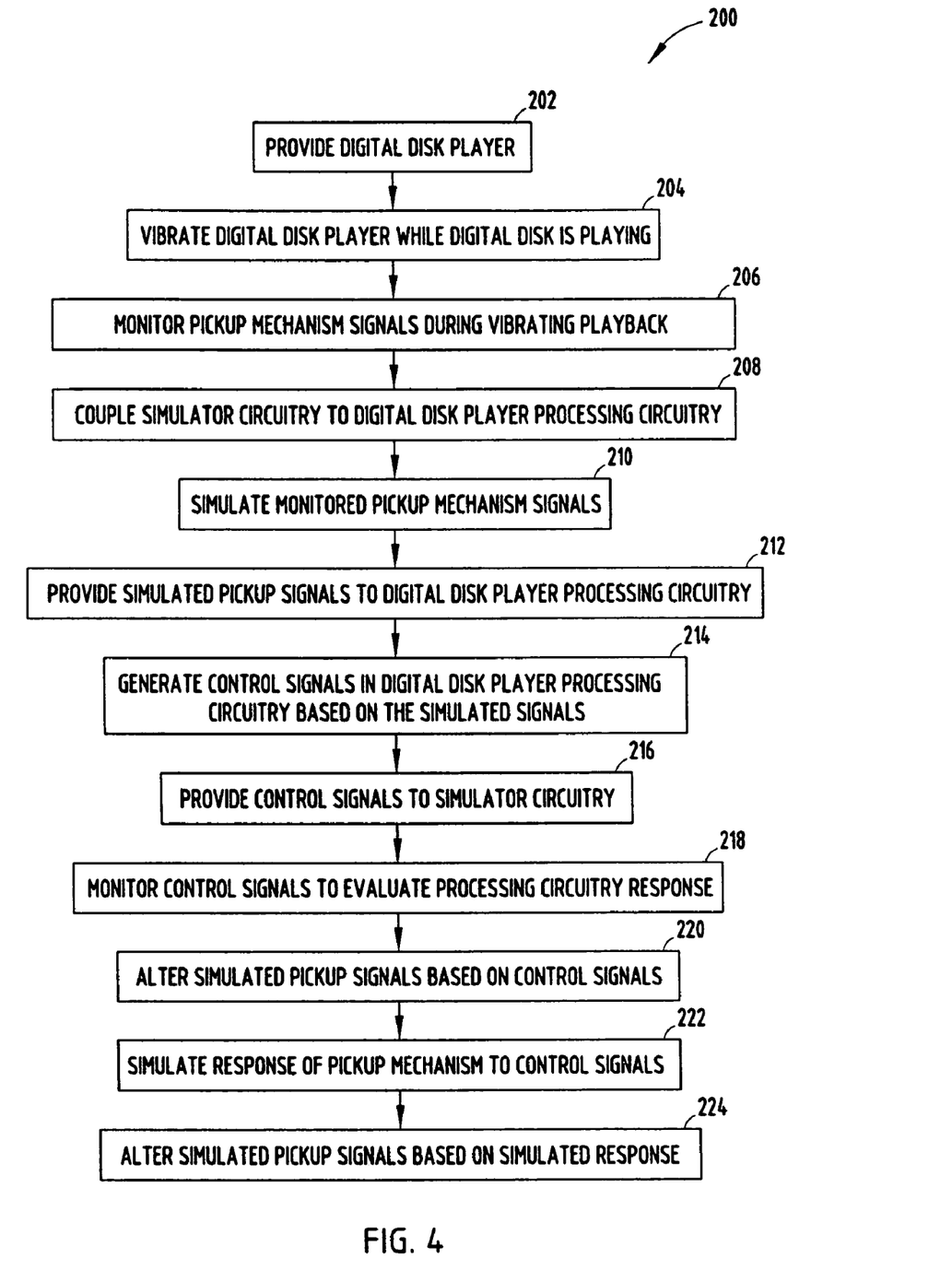
FIG. 4 is a flow diagram generally illustrating a second embodiment of a method for testing an optical digital disk player, according to the present invention.

FIG. 4 generally illustrates a method 200 for evaluating the response of optical digital disk player circuitry to anomalies. In a first step 202 of the method 200, an optical digital disk player is provided. In the present embodiment, the optical digital disk player is an audio CD player configured to play an audio CD. In an alternate embodiment, the optical digital disk player is a player capable of optically extracting digital data from an optical digital disk, including, for example, CD-ROM drives, rewritable CD drives, DVD players, and DVD writers.

In a second step 204 of the method 200, an optical digital disk that is an audio CD is played in the CD player provided in step 202 while the CD player is subjected to anomalies. In the present embodiment, the anomalies are physical vibrations introduced into the CD player while it is playing an audio CD. In an alternate embodiment in which an optical digital disk player other than an audio CD player is employed in the method, the anomalies are physical vibrations introduced into the optical digital disk player while it is playing an optical digital disk.

In a third step 206 of the method 200, signals provided by the pickup mechanism of the audio CD player are monitored while the audio CD player is subjected to physical vibrations during playback of an audio CD to identify unique signal characteristics of the pickup mechanism associated with the playback of an audio CD in the audio CD player during exposure to physical vibrations. It should be appreciated that the pickup mechanism signals can be captured electronically, such as, for example, by a digital oscilloscope, so that they can be retrieved for later analysis and review. In an alternate embodiment, the signals provided by the pickup mechanism of an optical digital disk player other than an audio CD player are monitored while the optical digital disk player is subjected to physical vibrations during playback of an optical digital disk to identify unique signal characteristics of the pickup mechanism associated with the playback of an optical digital disk in the optical digital disk player during exposure to physical vibrations.

In a fourth step 208 of the method 200, simulator circuitry is coupled to optical digital disk processing circuitry configured to process audio and/or data provided by an optical digital disk player pickup mechanism. In the present embodiment, the optical digital disk processing circuitry is audio CD processing circuitry configured to process audio and/or data provided by an audio CD player pickup mechanism.

In a fifth step 210 of the method 200, simulated pickup mechanism signals are created by the simulator circuitry, such that the simulated pickup mechanism signals substantially resemble pickup mechanism signals generated by an optical digital disk player playing an optical digital disk during exposure to an anomaly such as a vibration. In the present embodiment, the simulated pickup mechanism signals substantially resemble pickup mechanism signals generated by an audio CD player playing an audio CD during an anomaly such as a vibration.

In a sixth step 212 of the method 200, the simulated pickup mechanism signals are provided to the processing circuitry.

In a seventh step 214 of the method 200, the processing circuitry to which the simulated pickup mechanism signals have been provided generates control signals, based on the simulated pickup mechanism signals. The control signals are configured to control motors and/or mechanisms of optical digital disk players. In the present embodiment, the control signals generated include tracking, focus, sled and motor control signals.

In an eighth step 216 of the method 200, the control signals are provided to the simulator circuitry. In an alternate embodiment, the control signals are first provided to analog-to-digital converter circuitry prior to being provided to the simulator circuitry.

In a ninth step 218 of the method 200, the control signals are monitored by the simulator circuitry to evaluate the response of the processing circuitry to the simulated pickup mechanism signals.

In a tenth step 220 of the method 200, the simulated pickup mechanism signals are modified by the simulator circuitry based on the control signals.

In an eleventh step 222 of the method 200, the simulator circuitry simulates the response of a pickup mechanism of an optical digital disk player to the control signals. In the present embodiment, the simulator circuitry simulates the response of a pickup mechanism of an audio CD player to the control signals.

In a twelfth step 224 of the method 200, the simulated pickup mechanism signals are modified based on the simulated response of the pickup mechanism.

The invention, as described, advantageously provides methods 100 and 200, and a system 70 for evaluating the response of an optical digital disk player to anomalies encountered by the optical digital disk player during playback of an optical digital disk. The methods and system accomplish this by using simulated input signals, rather than by requiring the use of fragile defect optical digital disks, and rather than exposing the optical digital disks and/or optical digital disk player to potentially damaging physical anomalies, such as vibration. The method and system also advantageously provide for testing the response of optical digital disk players to multiple anomalies without requiring multiple defect optical digital disks to be manually swapped in and out of optical digital disk players. The above advantages can provide for more efficient, cost-effective testing of optical digital disk players.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A test system for evaluating the response of optical digital disk player components to anomalies in an optical digital disk, comprising:
a simulator comprising at least one digital output, said simulator configured to provide a simulated digital output signal at said at least one digital output simulating waveform characteristics provided by a pickup mechanism of an optical digital disk player playing an optical digital disk comprising defects, wherein said simulator is a computer comprising logic circuitry and memory comprising at least one algorithm, and wherein said at least one algorithm is configured to cause said logic circuitry to provide the simulated digital output signal;
a digital-to-analog converter coupled to said at least one digital output, said digital-to-analog converter being configured to convert the simulated digital output signal to a simulated analog output signal; and
processing circuitry coupled to said digital-to-analog converter, said processing circuitry being configured to receive the simulated analog output signal from said digital-to-analog converter, determine the value of at least one control signal to be issued from said processing circuitry based on the value of the simulated analog output signal, and provide the at least one control signal as an output.

2. The test system of claim 1, further comprising analog to digital converter circuitry coupled to said simulator and said processing circuitry, wherein said analog to digital converter circuitry is configured to convert the at least one control signal provided by said processing circuitry into digital form, and provide the at least one converted digital control signal to said simulator, and wherein said simulator is configured to monitor the converted digital control signal to evaluate the performance of said processing circuitry.

3. The test system of claim 2, wherein said simulator is further configured to alter the simulated digital output signal responsive to the converted digital control signal.

4. The test system of claim 1, wherein said simulator is configured to monitor the at least one control signal to evaluate the performance of said processing circuitry.

5. The test system of claim 4, wherein said simulator is further configured to alter the simulated digital output signal responsive to the control signal.

6. The test system of claim 5, wherein said simulator is further configured to simulate a response of at least one of a tracking adjustment mechanism, focus adjustment mechanism, and sled adjustment mechanism of an optical digital disk player to the at least one control signal, and generate at least one value indicative of the simulated response.

7. The test system of claim 6, wherein said simulator is configured to monitor the at least one value indicative of the simulated response to evaluate performance of said processing circuitry.

8. The test system of claim 7, wherein said simulator is further configured to alter the simulated analog output signal responsive to the at least one value indicative of the simulated response.

9. The test system of claim 1, wherein said computer is configured to monitor the at least one control signal to evaluate the performance of said processing circuitry, and is further configured to alter the simulated digital output signal responsive to the at least one control signal.

10. The test system of claim 1, further comprising an optical digital disk player simulation algorithm located in the memory of said computer, said optical digital disk player simulation algorithm configured to cause the logic circuitry of said computer to simulate a response of at least one of a tracking adjustment mechanism, focus adjustment mechanism, and sled adjustment mechanism of an optical digital disk player to the at least one control signal, and generate at least one value indicative of the simulated response.

11. The test system of claim 10, wherein said computer is configured to monitor the at least one value indicative of the simulated response to evaluate the performance of said processing circuitry, and is further configured to alter the simulated digital output signal responsive to the at least one value indicative of the simulated response.

12. The test system of claim 1, wherein said processing circuitry further comprises audio processing circuitry configured to process audio data from a pickup mechanism of an optical digital disk player playing an audio CD to provide an audio signal.

13. The test system of claim 1, wherein said processing circuitry further comprises a digital data output configured to provide the at least one control signal to monitoring circuitry external to said processing circuitry.

14. The test system of claim 1, wherein said simulator is further configured to generate a simulated digital output signal simulating waveform characteristics provided by an optical digital disk player playing an optical digital disk while exposed to physical vibration.

15. A test system for evaluating the response of an optical digital disk player to anomalies, comprising:
a simulator comprising at least one digital output, said simulator configured to provide a simulated digital output signal at said at least one digital output simulating waveform characteristics provided by a pickup mechanism of an optical digital disk player encountering an anomaly during playback of an optical digital disk, wherein said simulator is a computer comprising logic circuitry and memory comprising at least one algorithm, and wherein said at least one algorithm is configured to cause said logic circuitry to provide the simulated digital output signal;
a digital-to-analog converter coupled to said at least one digital output, said digital-to-analog converter being configured to convert the simulated digital output signal to a simulated analog output signal; and
processing circuitry coupled to said digital-to-analog converter, said processing circuitry being configured to receive the simulated analog output signal from said digital-to-analog converter, determine the value of at least one control signal to be issued from said processing circuitry based on the value of the simulated analog output signal, and provide the at least one control signal as an output, wherein said simulator is configured to monitor the at least one control signal to evaluate the performance of said processing circuitry.

16. The test system of claim 15, wherein the anomaly encountered during playback of an optical digital disk is a defect in the optical digital disk that is at least one of a scratch, a smudge, a spot, a manufacturing defect, and dirt on the surface of the optical digital disk.

17. A method for evaluating the response of an audio compact disk player circuitry to an audio compact disk having a defect, comprising the steps of:
coupling simulator circuitry including logic, memory comprising an algorithm, and a digital-to-analog converter to processing circuitry configured to process signals provided by an audio compact disk player;
executing the algorithm in the logic of the simulator circuitry to electronically create in the signal generating circuitry a simulated anomaly signal simulating waveform characteristics provided by a pickup mechanism of an audio compact disk player encountering an anomaly during playback of an audio compact disk;
providing the simulated anomaly signal to the processing circuitry;
processing the simulated anomaly signal in the processing circuitry to generate at least one control signal; and
monitoring the at least one control signal to evaluate the response of the processing circuitry to the simulated anomaly signal.

18. The method of claim 17, further including the step of altering the simulated anomaly signal responsive to the at least one control signal.

19. The method of claim 17, wherein the processing circuitry is configured to process data from an audio CD, and wherein the processing circuitry includes at least one of a skip indicator, mute audio indicator, and output data signal, and further including the step of monitoring at least one of the skip indicator, mute audio indicator and output data signal to evaluate the response of the processing circuitry to the simulated anomaly signal.

20. The method of claim 17, wherein the simulated anomaly signal simulates waveform characteristics provided by a pickup mechanism of an optical digital disk player encountering a defect in an optical digital disk played by the optical digital disk player.

21. The method of claim 20, wherein the simulated anomaly signal further simulates waveform characteristics provided by a pickup mechanism of an optical digital disk player encountering a vibration during playback of an optical digital disk.

22. The method of claim 20, wherein the processing circuitry is configured to process data from an audio CD, and wherein the processing circuitry includes at least one of a skip indicator, mute audio indicator, and output data signal, and further including the step of monitoring at least one of the skip indicator, mute audio indicator and output data signal to evaluate the response of the processing circuitry to the simulated anomaly signal.

* * * * *